June 2, 1936. A. CHITI 2,042,590
EMBROIDERY MACHINE
Filed July 10, 1931 9 Sheets-Sheet 1

Applicant:
Aroldo Chiti
By Mauro & Lewis
Attorney

June 2, 1936.  A. CHITI  2,042,590
EMBROIDERY MACHINE
Filed July 10, 1931  9 Sheets-Sheet 2
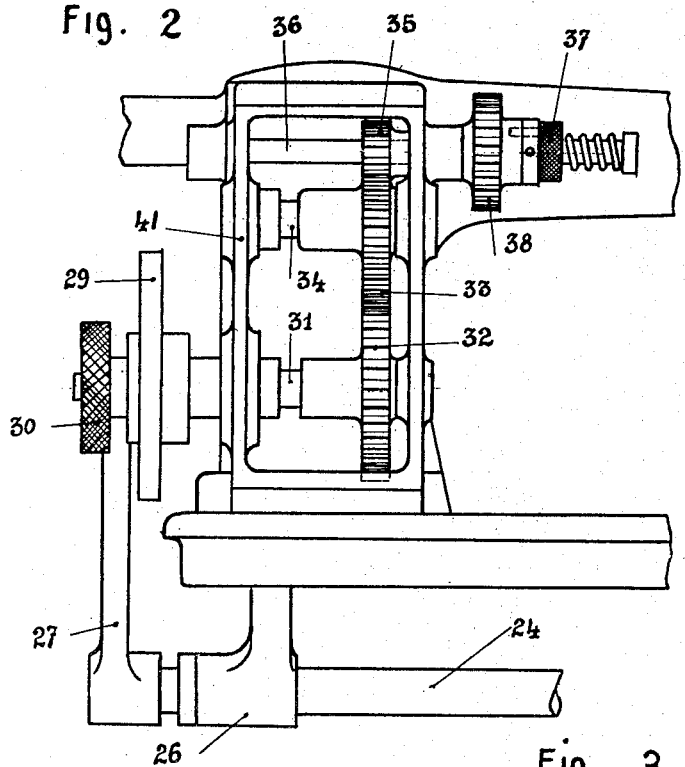
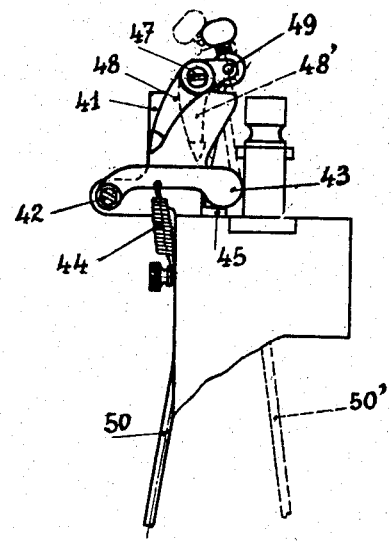
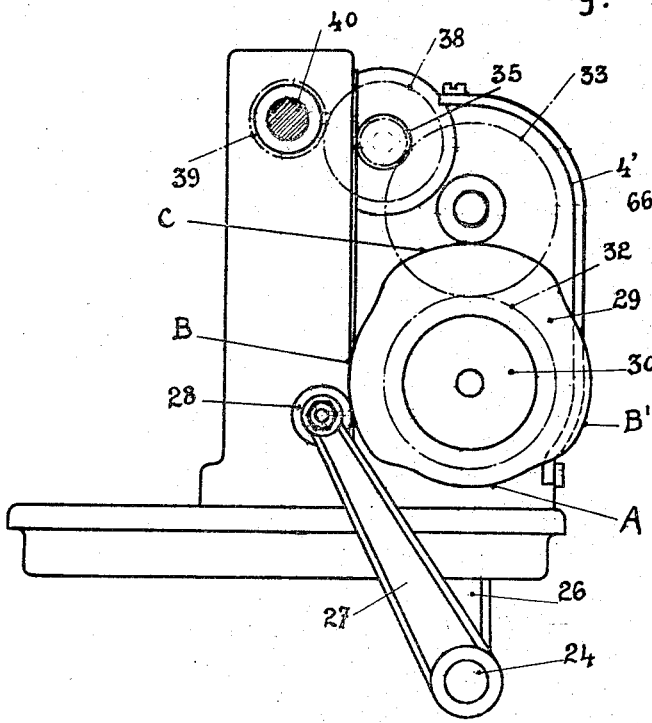
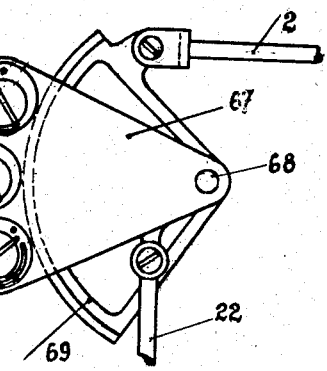

June 2, 1936.  A. CHITI  2,042,590
EMBROIDERY MACHINE
Filed July 10, 1931  9 Sheets-Sheet 3
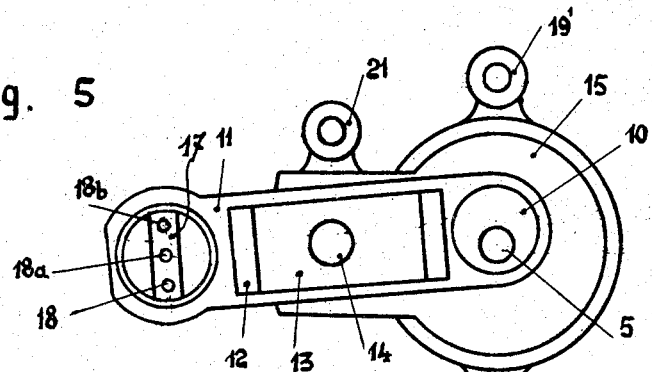
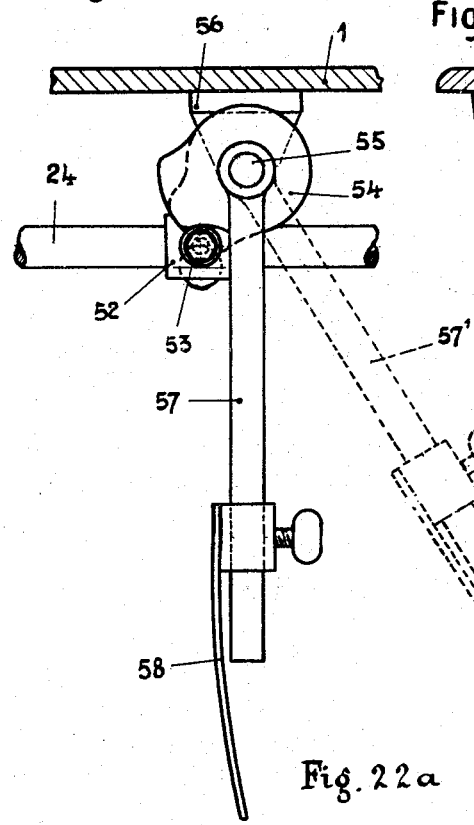
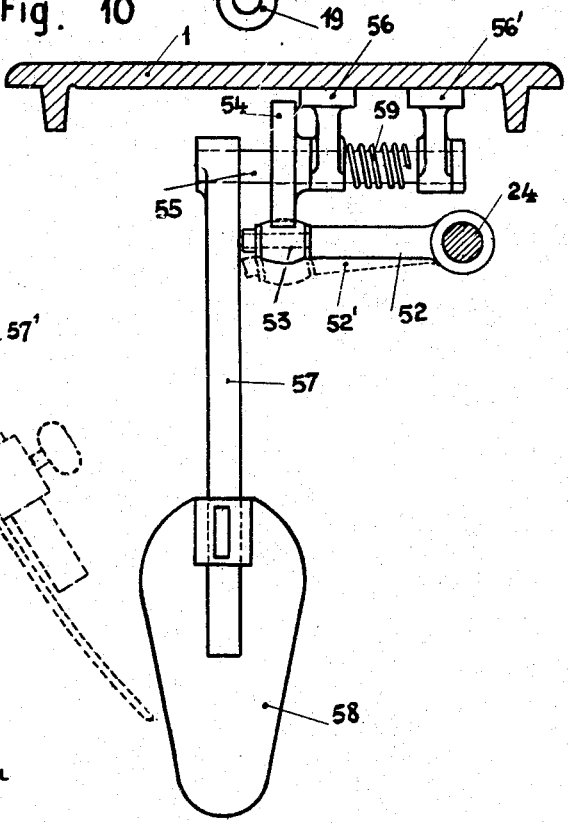
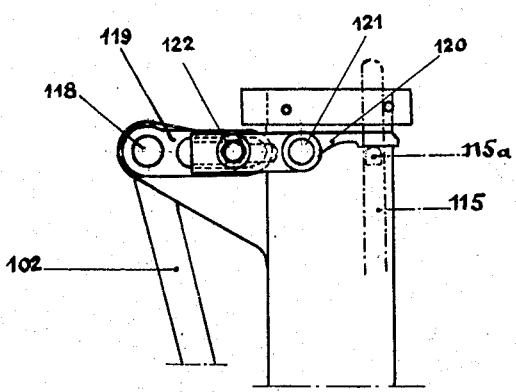
Applicant:
Aroldo Chiti
By Mauro & Lewis
Attorneys June 2, 1936.  A. CHITI  2,042,590
EMBROIDERY MACHINE
Filed July 10, 1931  9 Sheets—Sheet 4
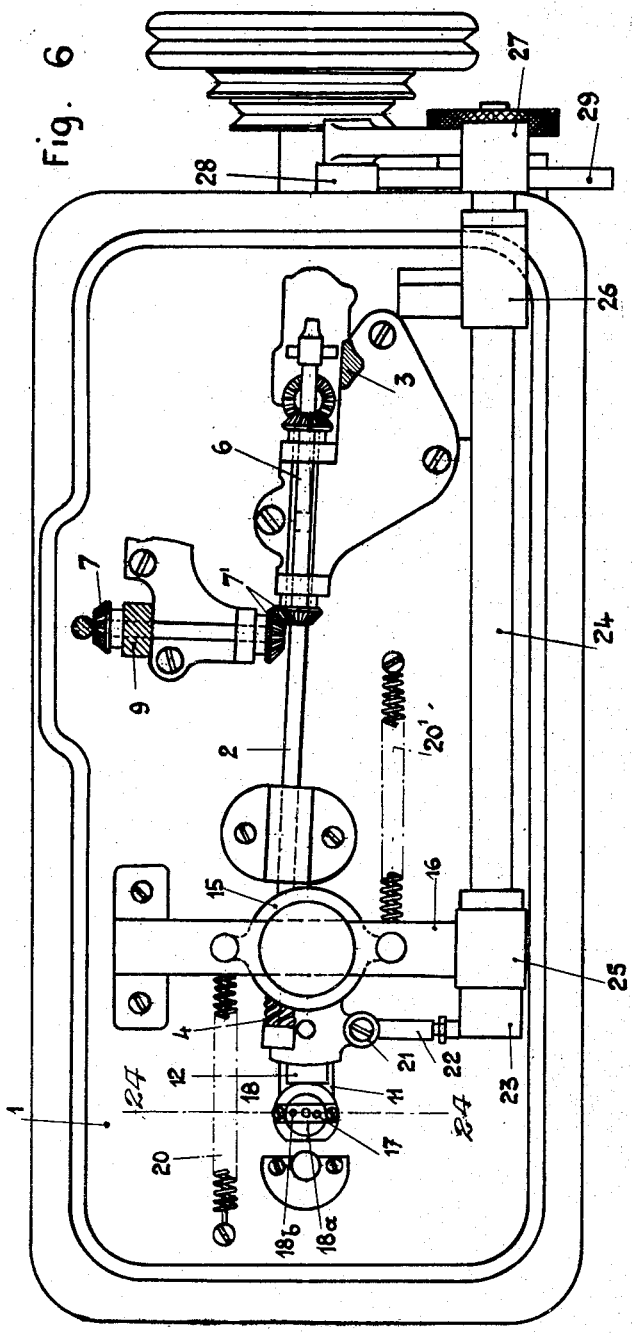
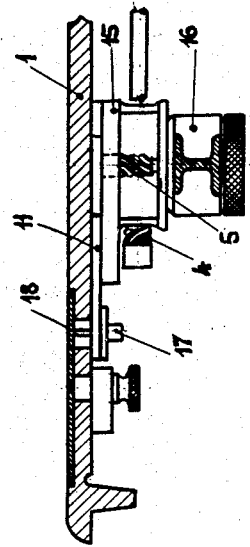
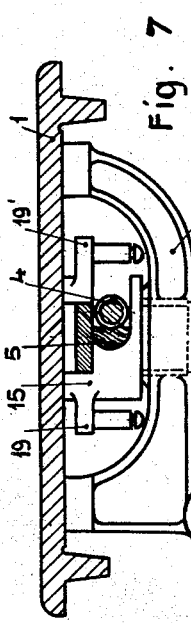

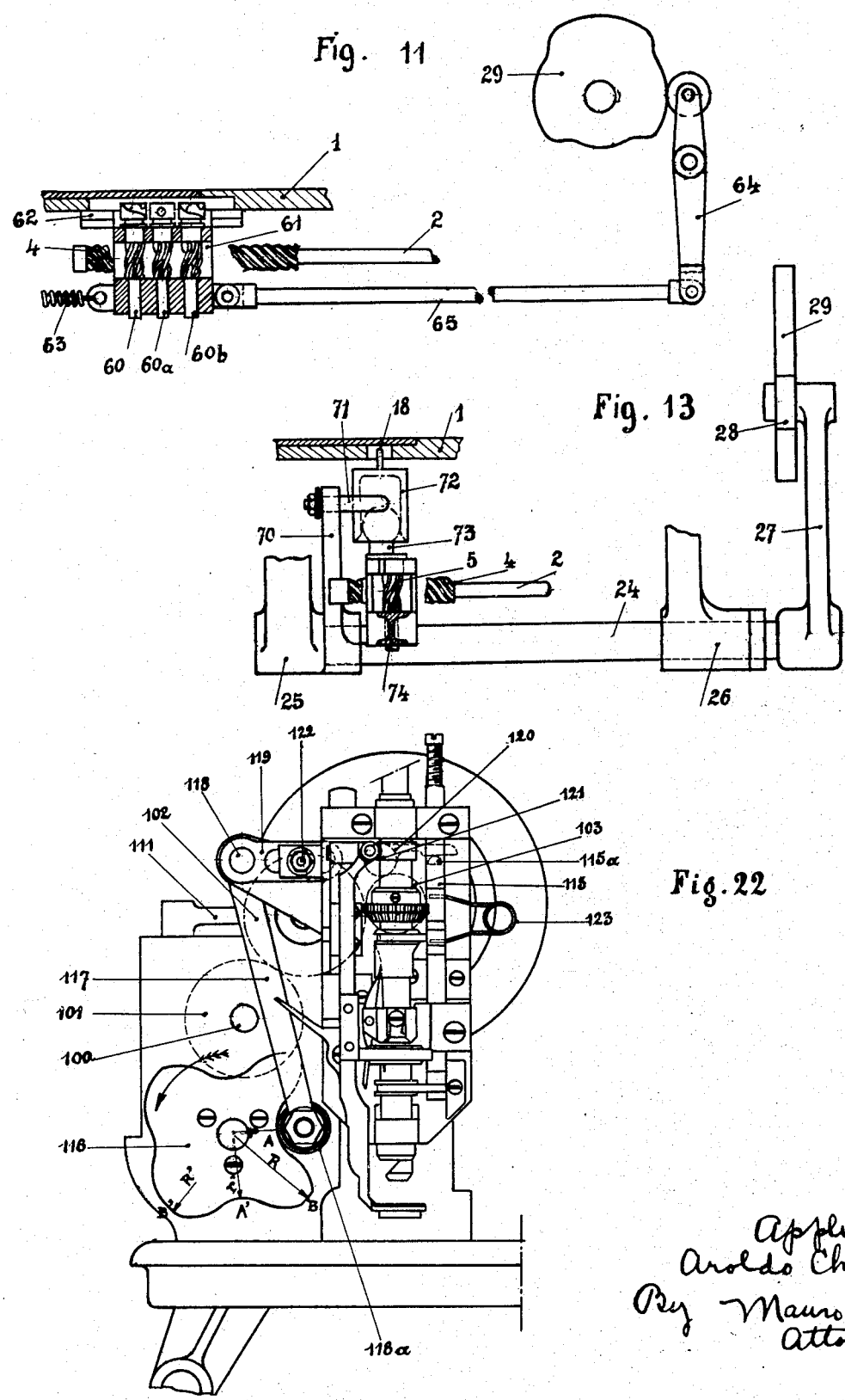

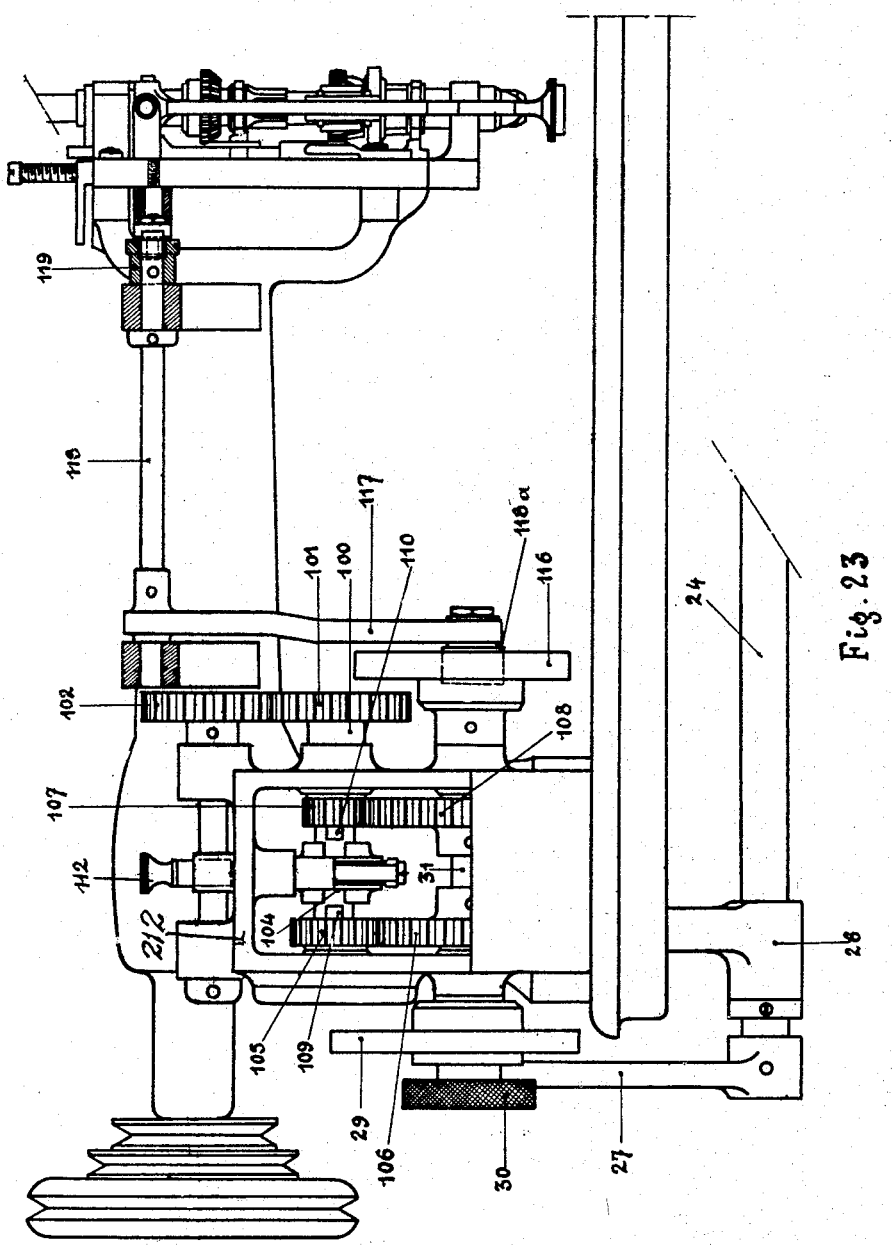

June 2, 1936.　　　　　　A. CHITI　　　　　　2,042,590

EMBROIDERY MACHINE

Filed July 10, 1931　　　　9 Sheets-Sheet 8

Inventor:-
Aroldo Chiti
By Mauro & Lewis
Attorneys

Patented June 2, 1936

2,042,590

UNITED STATES PATENT OFFICE 2,042,590

EMBROIDERY MACHINE

Aroldo Chiti, Turin, Italy, assignor to Anciens Etablissements R. Cornely & Cie, Societe Anonyme, Paris, France, a company of France Application July 10, 1931, Serial No. 549,968
In Italy July 18, 1930

15 Claims. (Cl. 112—98)

The object of my invention is a machine adapted to execute, besides the ordinary chain stitch, other stitches particularly suited for producing embroideries imitating hand made embroidery (flat stitch, Hungarian stitch, running stitch, back stitch, "point lancé", etc.) as well as new stitches of colour shading and dotting effects.

The machine according to my invention is advantageously of the type in which the chain stitch is obtained by means of a hooked needle, and a crank serves to direct the fabric in any desired direction under the presser foot of the machine. This type of needle is preferred because it makes it possible to use a great number of threads of various weights and grades that would hardly be workable with the usual sewing machine type needles. However, the same advantageous results can be obtained with a machine fitted with ordinary needles and shuttles.

The chief characteristic of my invention consists in that stitches of various lengths can be obtained with my machine, while the fabric is always given a feed that corresponds to the length of a normal stitch. This result is obtained by employing at least two threads which work successively either according to a predetermined order, or at will. Of these two threads that which remains at rest is caused to extend under the fabric (which will therefore be placed upside down on the machine) over a length corresponding to the sum of the lengths of the normal stitches made by the thread at work.

This system of forming the stitches affords several advantages. As the long stitches are obtained with a feed of normal length of the fabric, both the embroidering of any design, even in its smallest details, and the use of fabrics which would gather into folds if subjected to a feed corresponding to a long stitch, are considerably facilitated. The long stitch being made under the fabric to be embroidered, it is easier to follow the design and the stitches cannot be picked up by the foot of the machine, so that the embroidery thus obtained is perfect.

A manually operated device enables the worker to diminish at will the length of feed of the fabric, or even to reduce it to zero, while the machine is working, so that the stitch can be ended exactly at the edge of the design before starting the return movement of the work.

A device is also provided to automatically vary the length of feed according to the nature of the materials that are cooperating with the needle.

According to my invention, a device, fitted to the machine, and controlled with the knee, as hereinafter described, allows the operator to obtain stitches of any desired length, so that it becomes possible to fill up a pattern from one end to the other, thus imitating the "point lancé".

The thread distributors are actuated by a single cam, which can be easily and rapidly exchanged and the profile of which determines the type of stitch executed by the machine.

A release device, which throws the cam out of action, allows the machine to execute the normal chain stitch.

In this manner, all kinds of stitches may be obtained: ordinary hand stitches may be imitated, or new stitches may be created, and this simply by changing the cam or by making use of threads of various thicknesses and colours.

A stitch imitating the "point lancé" may be obtained by intertwining two threads, of which one, for example, is of silk, and the other of fine cotton. The silk thread will remain at rest, while three normal stitches are being made with the cotton thread, and the silk thread therefore extends on the under side of the fabric over a length corresponding to four normal stitches. By intertwining three threads, two of which form long and alternate stitches, while the third forms short stitches which remain hidden under the former ones, thus forming a kind of stuffing or padding, it is possible to obtain a supple stitch in relief, which, if made by hand, would require going twice over the work, and even then would not have the same precision as when obtained with my machine.

By intertwining three cotton threads of different shades, embroideries are obtained which display beautiful combinations of colors and give the illusion of changing color.

Furthermore, the automatic device for controlling the feed can also contribute in increasing the relief effect already obtained.

Preferred embodiments of my invention as applied to machines of a known type will be hereinafter described with reference to the accompanying drawings, given merely by way of example. But is should be well understood that my invention might quite as well be applied to machines of different types.

In the drawings:

Fig. 2 is a partial back view of the same machine;

Fig. 3 is a side view of the cam controlling device;

Fig. 4 is a side view of the feed stopping device;

Fig. 5 is a view, at an enlarged scale of the rod for controlling the distributor;

Fig. 6 is a bottom view of the machine;

Figs. 7 and 8 are a side view and a longitudinal view respectively both partly in section of the device for controlling the operation of the rod of the distributor;

Figs. 9 and 10 are a front view and a side view respectively both partly in section of a device controlled by the operator's knee, and serving to obtain at will, during the working of the machine, stitches of any desired length;

Fig. 11 shows another embodiment in which the usual distributors of hooked needle machines is made use of;

Fig. 12 is a view illustrating another embodiment and showing how the system according to my invention can be applied to machines having ordinary needles and shuttles.

Fig. 13 shows another embodiment of the device for distributing the threads;

Figs. 22 and 23 are an end view and a front view respectively of the machine provided with a change speed device for the cam and with a mechanism for automatically varying the length of the stitches;

Fig. 22a is a partial view, analogous to Fig. 22, the organs located in front in that view being cancelled in order to show in detail the means for automatically controlling the length of the stitches.

Figure 1:
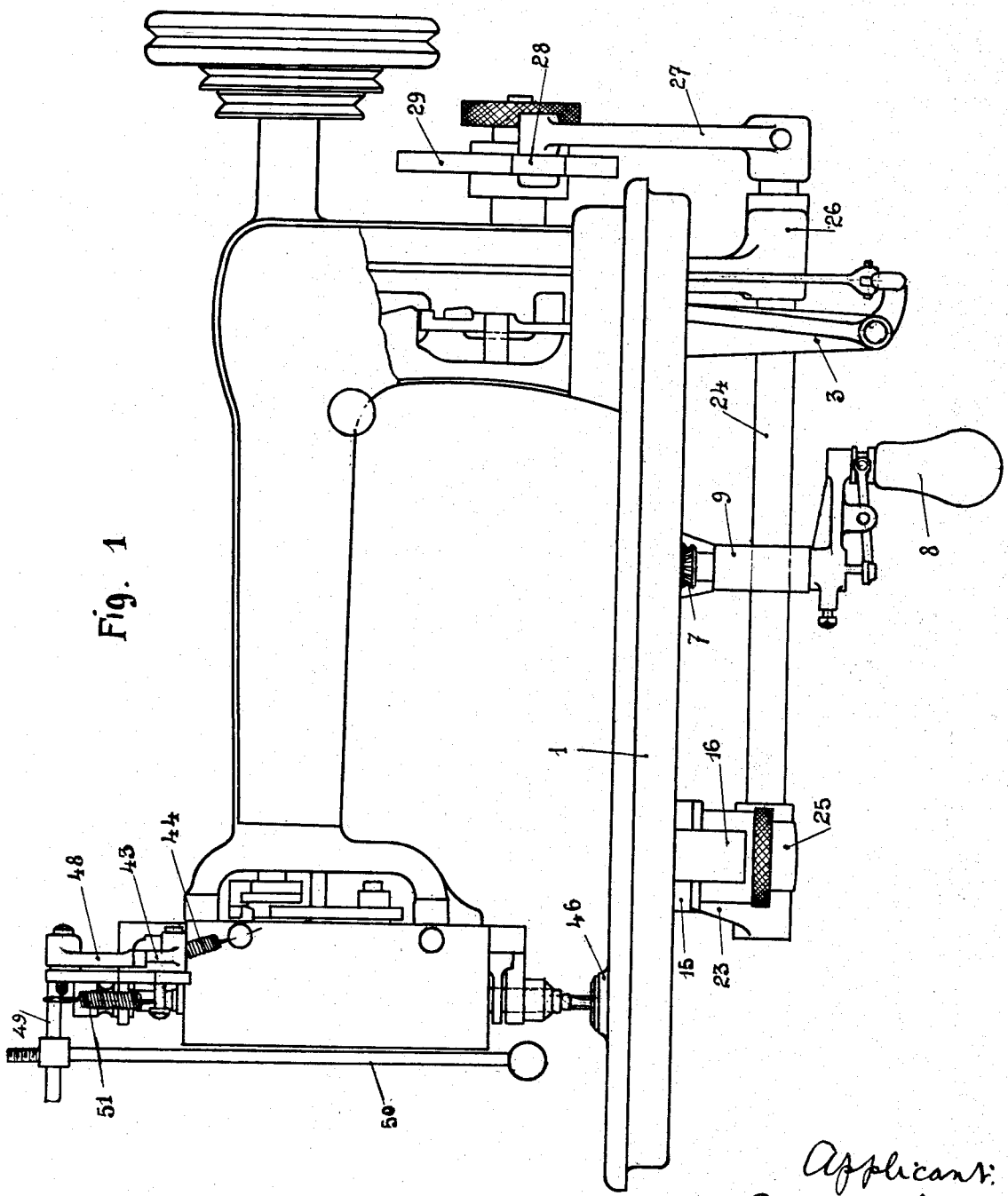
Fig. 1 is a front view of the machine according to my invention.

In Figs. 1, 2 and 6, the table or work plate 1 of the machine is provided on its under side with the organs for transmitting the movement to the thread distributor. 2 designates the usual shaft to which a rectilinear alternating motion is imparted at one of its ends through a bell-crank lever carried by support 3. Shaft 2 is provided at its other end with an endless screw 4 meshing with a gear 5 and which plays the part of a rack adapted to rotate said gear 5 in an oscillatory manner when shaft 2 moves with said rectilinear reciprocating movement. Shaft 2 may also be given a rotary motion about its own axis by means of a slotted sleeve 6 in which it is slidably keyed and of two couples of bevel gear wheels 7 and 7' which are controlled through the directing crank handle 8 (which also controls the clutch) carried by support 9.

It will be noted that shaft 2 of the machine according to my invention is not in the position which it usually occupies in ordinary machines, since gear 4—5 does not directly control the distributor under the needle plate. Gear 5 is journalled in a support 15 which is itself pivoted at its lower end in cross piece 16 secured to the under face of table 1 (Fig. 7). Said gear 5 drives an eccentric 10 (Fig. 5) which is integral therewith and over which is slipped the strap of connecting rod 11. A guide 13, pivoted at 14 to support 15 is adapted to slide in a slot provided in connecting rod 11. The free end of connecting rod 11 is ring-shaped and a member 17 is fixed thereto which carries the three small thread distributing tubes 18, 18a, 18b of the distributor. (Fig. 5.) It will readily be understood that the normal oscillatory movement of support 17 for causing the thread distributing tubes to cooperate with the needle is imparted to said support by shaft 2 through gears 4 and 5, eccentric 10 and connecting rod 11. Support 15 is provided with two lugs 19 and 19' to which are fixed springs 20 and 20', Fig. 6, which tend to rotate the support about its axis in such manner that tube 18b may be brought under the needle plate. One end of a small connecting rod 22 of adjustable length is connected to another lug 21 projecting from a prolonged part of support 15 (Figs. 5 and 6). The other end of said connecting rod 22 is pivoted to crank 23 keyed to one end of shaft 24 which rotates in bearings 25 and 26. The first of said bearings is provided in cross piece 16 and the other one is secured to table 1. To the other end of shaft 24 is secured arm 27 which carries a roller 28 which is kept constantly in contact with the external surface of cam 29 (Fig. 1) by the action of springs 20 and 20'. Thus cam 29 controls, through arm 27, shaft 24 and connecting rod 22, the angular position of support 15 with respect to its support 16, and therefore the position of pivot 14 and the initial position of support 17 with respect to the needle. The outline of said cam 29 is so chosen as to bring into operative position at the desired time one or the other of the thread distributing tubes 18, 18a and 18b.

Cam 29 is fixed by means of milled wheel 30 (Fig. 2) on a shaft 31 which carries toothed wheel 32, in mesh with toothed wheel 33 which is keyed on shaft 34. Toothed wheel 33 is in mesh with pinion 35 carried by shaft 36. Another toothed wheel 38 engaging a pinion 39 (Fig. 3) mounted on the main shaft 40 of the machine can be coupled with said shaft 36 by means of a clutch 37 (Fig. 2).

Gears 32—33—35 are inclosed in a protective casing 41, in the walls of which are provided bearings for shafts 31—34—36.

Supposing that the machine is to utilize three different threads, and that cam 29 has the outline shown in Fig. 3, that is to say an outline corresponding to the type of stitch illustrated in Figs. 20 and 21, the operation of the machine is as follows:

The ends of three threads of the desired material and colour are engaged into the tubes 18, 18a and 18b respectively, said threads coming from three spools mounted on a common support fixed to the table. When the machine is started, there takes place, besides the usual movements that take place in other machines of that type adapted to execute a chain stitch, an oscillatory movement of support 17 caused by the movement of small connecting rod 11, actuated as above indicated by endless screw 4 meshing with vertical gear 5 which is integral with eccentric 10. Said oscillatory movement causes one of the thread distributing tubes to cooperate with the needle and a chain stitch is thus obtained.

As long as roller 28 is in contact with the part of the cam 29 designated by A, tube 18b cooperates with the needle. When the roller comes to run on the part of the cam designated by B, it causes shaft 24 to rotate about its own axis, and consequently the pivot 14 of connecting rod 11 will be displaced with respect to table 1, so that support 17 will be caused to bring tube 18a into the position previously occupied by tube 18b, and the thread carried by said tube 18a will now be brought into action and will make a stitch.

As the cam further rotates and roller 28 comes in contact with part C of the cam, tube 18 and the corresponding thread will now be brought into operative position. The part of the outline of the cam designated by B' and identical to B will now become operative and the machine will again make a stitch with the thread carried by tube 18a.

From this moment, the part A of the profile of the cam comes again into action and a new cycle identical with the one above described is recommenced. While one of the threads is working, the other two extend under the fabric which is being embroidered, so that, for example, in the case above described, while the stitch is first executed with the thread 18a, then with thread 18, then again with stitch 18a, the thread issuing from tube 18b stretches out underneath the fabric, so as to form a stitch having a length equal to that of four normal stitches. The same is true of the thread issuing from tube 18, whereas the stitch made by the thread issuing from the tube 18a will have only a length equal to that of two normal stitches.

In order to better illustrate the operation of the machine, I have shown in Figs. 24 to 31 an example that corresponds to the utilization of three threads 78, 79 and 80 of different colours. For instance thread 78 is red, thread 79 is white, and thread 80 is blue.

The three thread distributing tubes 18, 18a and 18b, which correspond to threads 80, 79 and 78 respectively are carried by a support 17, which is given an oscillatory displacement about the axis of needle 1. In other words support 17 is caused to move in a horizontal plane so that each of its points moves along a curved line with a reciprocating manner. In the example of Figs. 24 to 31, the relative position of support 17 with respect to table 1 is such that thread distributing tube 18b describes a curve that closely surrounds the vertical axis of needle n. However, it is possible, through suitable means, to modify the initial position of support 17 with respect to table 1 so that it is the curve described by tube 18a (or by tube 18) that closely surrounds the vertical axis of needle n.

Needle n is given a reciprocating vertical motion through a mechanism of a well known type. Table 1 is provided with a hole 1a so that needle n may pass through fabric 77, which is stretched on table 1, and pick up the threads from the distributor.

Figure 24:
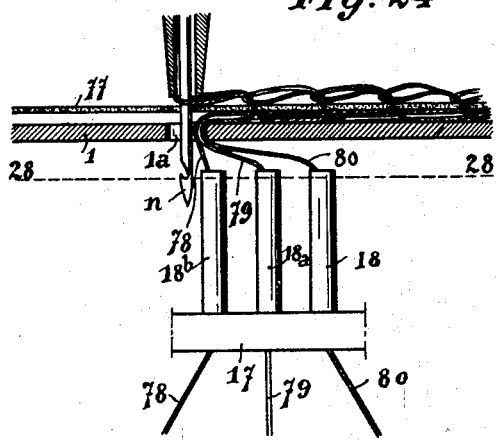
Fig. 24 is a diagrammatic vertical sectional view corresponding approximately to line 24—24 of Fig. 6 showing the respective positions of the table, the needle, and the thread distributors.
Figure 25:
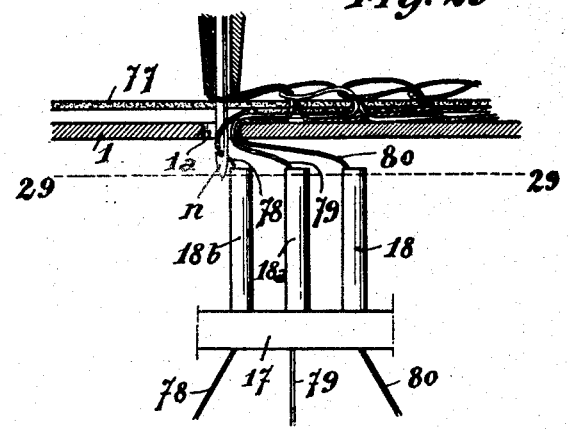
Figs. 25, 26 and 27 are similar views corresponding to different relative positions of the needle and of the thread distributors with respect to the table.
Figure 28:
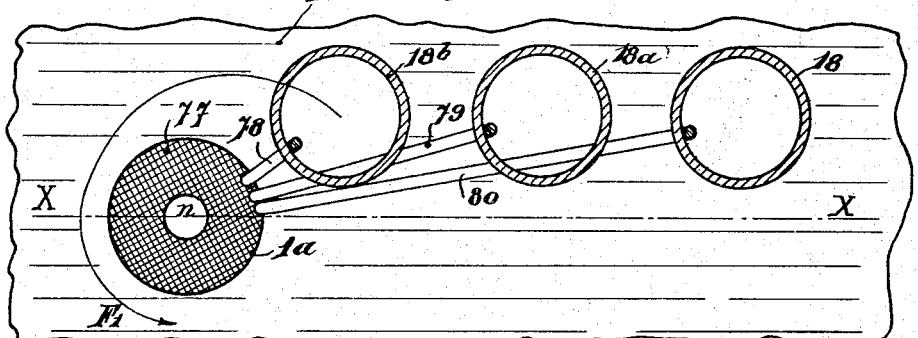
Fig. 28 is a sectional bottom view on the line 28—28 of Fig. 24.
Figure 29:
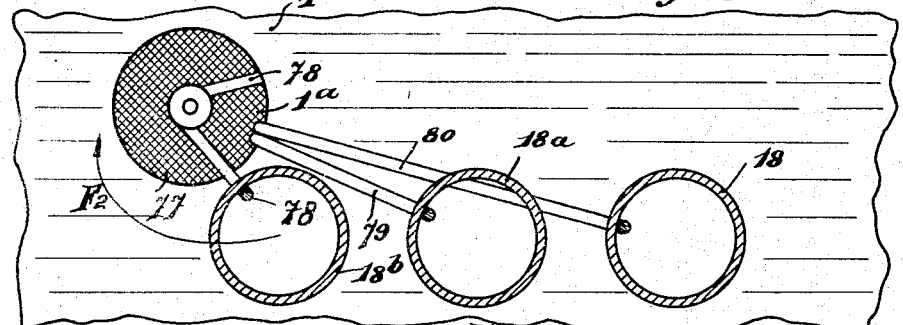
Fig. 29 is a sectional bottom view on the line 29—29 of Fig. 25.

In the position shown in Figs. 24 and 28, needle n is at the bottom of its vertical stroke and the portion thereof that is located above fabric 77 is engaged in a loop of thread 80 formed by the preceding stroke of the needle. The thread distributing tubes 18, 18a and 18b are located behind the vertical plane X—X (Fig. 28) passing through the vertical axis of needle n.

Support 17 is then given a horizontal movement so that tube 18b moves along a curved line such as that shown by arrow $F_1$ of Fig. 28. Tubes 18, 18a and 18b are thus brought into the position shown by Figs. 25 and 29, so that thread 78 is brought against needle M and is caught in the hooked part thereof.

Figure 26:
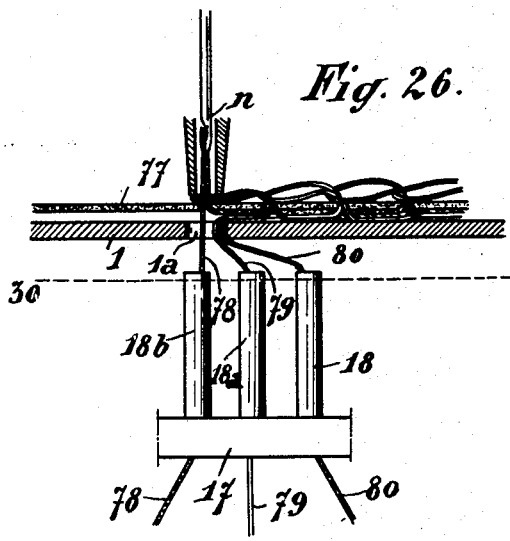
Figure 27:
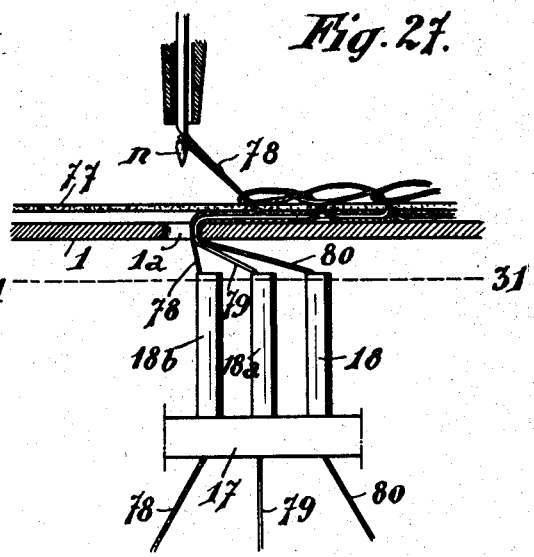
Figure 30:
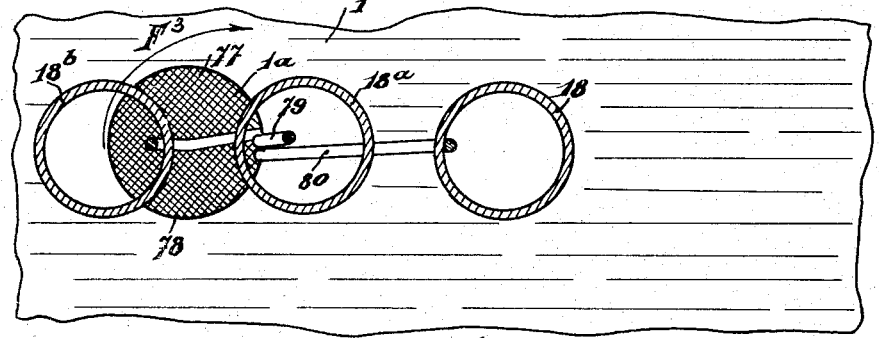
Fig. 30 is a sectional bottom view on the line 30—30 of Fig. 26.

Needle n now moves in an upward direction so that its point passes on the other side of the fabric 77, drawing thread 78 together with it, as shown in Figs. 26 and 30. Simultaneously, support 17 has been given a horizontal displacement in the direction of arrow $F_2$ of Fig. 29, so as to be brought into the position of Fig. 30.

Figure 31:
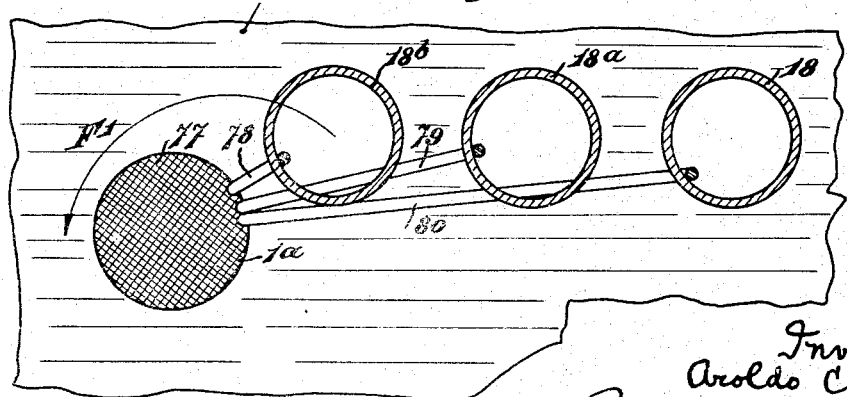
Fig. 31 is a sectional bottom view on the line 31—31 of Fig. 27.

Support 17 then completes its return movement in the direction of arrow $F_3$ of Fig. 30, so that tubes 18, 18a and 18b are brought back into their initial position with respect to table 1, as shown in Fig. 31. Simultaneously fabric 77 has been given a forward displacement toward the right hand side of Fig. 27, so that a loop is formed by thread 78, and the parts are ready for a new cycle of operations that will produce another stitch. The presser foot 46 that produces that displacement of fabric 77 has not been shown in Figs. 24 to 31 for the sake of clearness. Besides, the operation of said presser foot is well known in the art.

As above stated, the initial position of support 17 with respect to table 1 can be changed through any suitable device so that tube 18a and thread 79 (or tube 18 and thread 80) will be brought into operative position with respect to needle n and will occupy the successive positions that have been shown and described for tube 18b and thread 78.

It will readily be understood that the threads that remain at rest, that is the threads that are not picked up by the needle, (threads 79 and 80 in the cycle of operations shown in Figs. 24 to 31) are merely caused, by each forward movement of the fabric, to extend on the face of the fabric that is in contact with table 1 along a length corresponding to one stitch.

For instance, in the example shown in Figs. 24 to 31 (in which support 17 is displaced in such manner that each of the thread distributing tubes 18, 18a and 18b is successively brought into operative position with respect to needle n) each of the threads 78, 79 and 80 extends along a length corresponding to the stitch made with itself and to the stitches made with the two other threads, that is along a length corresponding to three normal stitches.

Figs. 22 and 23 show a machine provided with a device for controlling cam 29 which includes a change speed arrangement. The purpose of that arrangement is to allow for replacing a given cam 29 by another cam requiring a different speed of revolution with respect to the main shaft of the machine. Experience has taught that it may be advantageous to obtain a rotation of the shaft 31 of cam 29 equal to one fourth or one sixth of the rotation of the main shaft of the machine, while leaving the cam thus driven in a predetermined relation with respect to the general cycle of the machine.

The change speed device that is shown by way of example in Figs. 22 and 23 comprises shaft 100, driven by pinion 101, which is in turn driven through pinion 102 by the main shaft of the machine.

A sliding dog 104, slidably keyed on shaft 100, is provided with projections adapted to engage on corresponding projections 109 or 110 rigidly fixed to pinions 105 and 107 respectively, these pinions being loose on shaft 100. It will be understood that when the projections of sliding dog 104 are engaged on projections 110, the movement of shaft 100 is imparted through pinions 107 and 108 to shaft 31. On the contrary, when the projections of dog 104 are engaged on projections 109 of pinion 105, the movement of shaft 100 is communicated to shaft 31 through pinions 105 and 106, and therefore with a different ratio.

The positions of projections 109 and 110 are so arranged as to keep cam 29 in proper relative angular position with respect to the other parts of the machine.

The displacement of sliding dog 104 is controlled through a lever 111 (Fig. 22) provided with a milled knob 112 (Fig. 23). Lever 111 can be locked in any of three different positions by means of a spring pressed latch (not visible in the view of Fig. 23) cooperating with frame 212 and moved by means of knob 112.

Figs. 1 and 4 show the hand operated device which makes it possible to diminish or even, if desired, to reduce to zero the feed movement of the fabric to be embroidered, while the machine is working. That device essentially comprises a support 41 fixed to the upper part of the head of the machine and to which arm 43 is pivoted at 42. Said arm 43 is always kept in contact, by means of spring 44, with the upper end of rod 45 which controls, through its reciprocating movement and in the usual manner, the displacement of foot 46. To support 41 is also pivoted at 47 the bell crank lever 48, which carries pivot 49 to which is keyed the end of lever 50, and to which is fixed the extremity of spring 51. When lever 50 is pushed forward with respect to the operator, so as to occupy position 50', shown in dotted lines, lever 48 rotates about pivot 47 until it comes into position 48', in which it prevents arm 43 and consequently rod 45 from moving upwardly, so that presser foot 46 no longer moves, and the fabric is not displaced.

Figs. 22, 22a and 23 show a device for automatically controlling the length of feed of the fabric by the machine, said device being useful for the good formation of the stitch, when several materials are used simultaneously, some of these materials requiring a greater length of feed than the others.

The principle of that device consists in directly controlling the movement of the sliding piece 115 of the machine, which acts in the known manner upon the presser foot or the equivalent, through a cam 116 keyed on shaft 31 and comprising as many active sections as cam 29. Said cam acts on sliding piece 115 through roller 118a and lever 117 which controls the rotary movement of shaft 118. On the other hand a lever 119 is keyed on shaft 118, which lever acts upon one extremity of lever 120 adapted to pivot about axis 121 and the other end of which cooperates with projection 115a of the usual sliding piece 115. Owing to a piece 122 adapted to slide in grooves provided in levers 119 and 120, and adjustably secured therein by means of a milled knob, it is possible to adjust the intensity of the action of the cam upon the length of the stitch.

The operation of that device is as follows: Under the action of the well known spring 123, piece 115 tends to remain in its highest position, which results in roller 118a being applied against cam 116 at A. When passing over portion B of cam 116, roller 118a is moved toward the right (Fig. 22), the left hand end of lever 120 is raised, which causes link 115 to move downward a distance equal to difference R—r, R being the distance from B to the center O of the cam, and, r being the distance from A to center O of said cam.

The length of feed of the machine is equal, or rather proportional to R—r. Then, when the stitch has been made, the roller moves along portion A' and then along portion B' of the periphery of the cam, causing the formation of a stitch proportional to length R'—r', and so on, the coefficient of proportionality being adjusted by acting upon the position of piece 122.

When it is desired to obtain stitches of any desired length, for instance when it is desired to fill up the design of an embroidery from one edge to the other one, use may be made of the device shown in Figs. 10 and 9.

An arm 52 is keyed in the proper position on shaft 24. Said arm 52 carries at its extremity a roller 53 against which bears a cam 54 keyed on shaft 55, which is journalled in supports 56 and 56' secured to table 1 of the machine. An arm 57 is also keyed on shaft 55, which arm extends vertically in a downward direction and is provided at its lower end with a plate 58 against which the operator's knee can be brought to press. A spring 59 maintains arm 57 in the vertical position. On shaft 31, there is keyed, instead of cam 29, a disk which constantly maintains tube 18b in the operative position. When arm 57 is displaced by the knee bringing it into position 57' shown in dotted lines in Fig. 9, the projecting part of cam 54 engages roller 53 of arm 52 and pushes it in a downward direction, thus bringing it into position 52'. Shaft 24 is thus caused to rotate through the necessary angle for imparting such a displacement to support 15 that said support brings tube 18a into the active position and thus causes the thread passing through said tube 18a to cooperate with the needle.

Fig. 11 shows in a diagrammatic manner another embodiment in which the same results are obtained by making use, instead of tube distributors, of the usual distributors for embroidery machines, which are designated by reference numbers 60, 60a, and 60b, and are mounted in a support 61 adapted to slide in guides 62. Said distributors are given a reciprocating rotary motion through endless screw 4. Spring 63 tends constantly to maintain distributor 60b in the active position. Cam 29, acting upon lever 64 and rod 65 brings the desired distributor into the operative position, according to the shape of its outline, by displacing support 61.

Fig. 12 shows in a diagrammatical manner another embodiment in which use is made, instead of a hooked needle, of a needle of the type used in the ordinary sewing machines. In that case, the thread must be contained in shuttles which must be brought under the needle in an order corresponding to the kind of stitch to be made. Shuttles 66—66a—66b are mounted in a support 67 adapted to rotate about pivot 68. A toothed sector 69, also pivoted at 68 and receiving an alternating movement from shaft 2, keeps the shuttles rotating, while rod 22, jointed at one end to support 67 and at the other end to crank 23 (Fig. 6), shaft 24, arm 27 and cam 29, imparts to support 67 the necessary displacements for bringing the shuttles to their operative position in the desired order. Of course in this case instead of obtaining a chain stitch, I obtain a lock stitch, and there is a single needle thread, which interlocks in the fabric with the various shuttle threads.

Fig. 13 shows, also in a diagrammatic manner, another embodiment applicable to machines provided with hooked needles. The ordinary endless screw 4 actuates gear 5 mounted vertically on support 74 directly under the needle plate. On the upper part of gear 5, pivot 73 is eccentrically mounted, which pivot engages hollow cylinder 72 which carries distributing tubes 18 at its upper part. Cylinder 72 is adapted to oscillate with respect to a fork 71, which is in turn pivoted to the end of lever 70. Said lever 70 is keyed on shaft 24, which rotates in bearings 25 and 26 and is actuated, as above explained, through arm 27, roller 28 and cam 29. It will be readily understood that the reciprocating rotary motion of gear 5 causes cylinder 73, and accordingly the tubes carried by it, to move with a reciprocating rotary motion about the axis of the needle and the transversal displacements transmitted to the cylinder through the above described other organs connected to arm 70 bring the tubes in their operative position in a predetermined order, according to the kind of stitch to be obtained.

Figure 14:
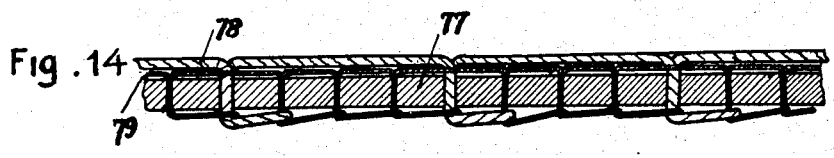
Figs. 14, 15, 16, 17, 18, 19, 20, 21 show diagrammatically, in section and in plan view, four kinds of stitches that may be obtained by means of my improved machine.
Figure 15:
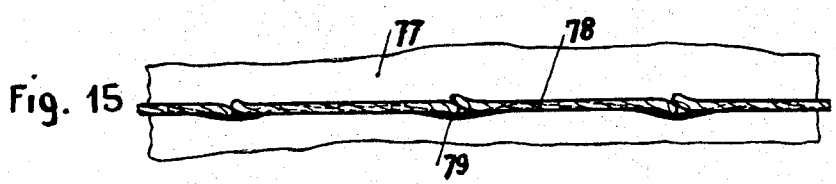

The machine according to my invention makes it possible to obtain many different stitches of various kinds. By way of example, I have diagrammatically shown in Figs. 14 to 21 of the accompanying drawings four different stitches. The first one is shown in elevational view in Fig. 14, (the fabric being supposed to be sectioned) and in plan view in Fig. 15. That stitch imitates the running stitch and is formed by the intertwisting of only two threads. The fabric is shown at 77, and the two threads at 78, 79. The thread 78 is the only one to be visible, while thread 79 only serves to fix thread 78 and will therefore be of fine cotton and of the same colour as the fabric, so as to be mixed up with the latter and to cause only thread 78 to be seen. Thread 78 remains at rest during three stitches which are made by thread 79 and remain hidden under thread 78, which thus gives stitches having a length equal to that of four normal stitches.

Figure 16:
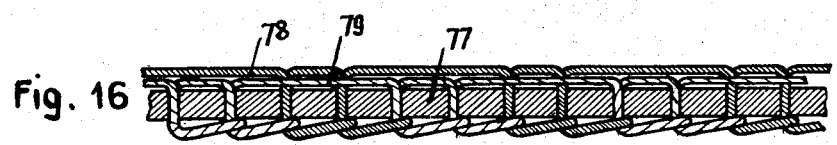
Figure 17:
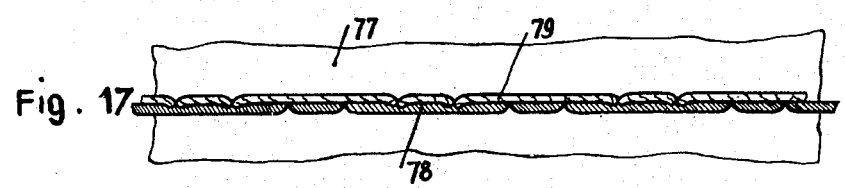

Figs. 16 and 17 show in elevational view and in plan view respectively a running stitch combined with a back stitch. In this case, both thread 78 and thread 79 remain visible, and the effect is obtained by causing two stitches of each thread to alternate with two stitches of the other thread.

Figure 18:
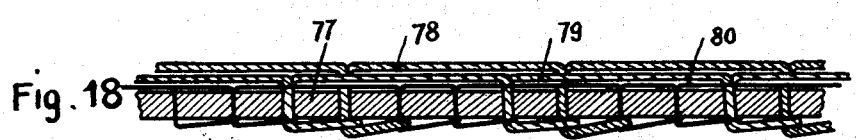
Figure 19:
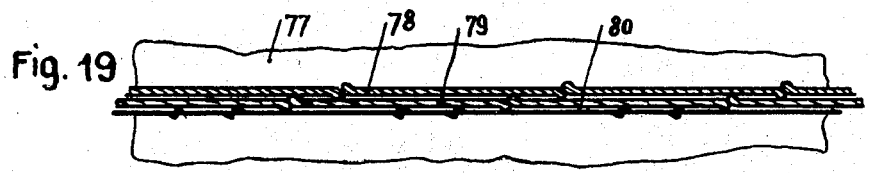

Figs. 18 and 19 show a stitch obtained by the intertwining of three threads 78—79—80, working in this order: 80—80—79—78.

Figure 20:
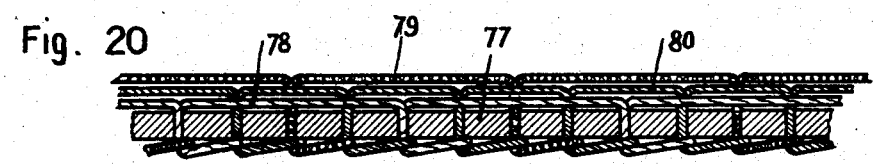
Figure 21:
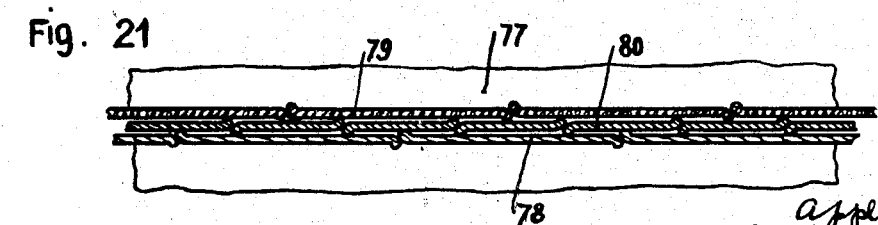

Finally Figs. 20 and 21 show a stitch obtained by the intertwining of three threads and imitating the Hungarian point. Threads 78 and 79 form long alternate stitches, while thread 80 forms short stitches. For obtaining that effect, the threads work in the order: 78—80—79—80.

While I have disclosed what I deem to be preferred embodiments of my invention, it should be well understood that I do not wish to be limited thereto as there might be changes made in the arrangement, disposition and form of the parts without departing from the principle of my invention as comprehended within the scope of the appended claims.

What I claim is:

1. An embroidery machine of the type described comprising in combination, a needle, at least two distinct thread distributors, and means for bringing said thread distributors into their operative positions under said needle in any of a plurality of different orders.

2. An embroidery machine of the type described comprising in combination, a needle, at least two thread distributors, and hand actuated means for bringing said thread distributors into their operative positions under said needle in any of a plurality of different orders.

3. An embroidery machine of the type described comprising in combination, a needle, at least two thread distributors, a main driving shaft, a cam, means for driving said cam from said main shaft, and means, controlled by said cam, for successively bringing said thread distributors into their operative positions under said needle in a predetermined order.

4. An embroidery machine of the type described comprising in combination, at least two thread distributors adapted to cooperate each with one thread, respectively, means for successively bringing said thread distributors into their operative positions, whereby one of said threads can be caused to extend over a length corresponding to a plurality of stitches executed by the other thread, means for giving a feed motion to the fabric to be embroidered, and means for diminishing and if necessary reducing to zero the value of said feed.

5. An embroidery machine of the type described comprising in combination, a needle, at least two thread distributors, a main driving shaft, a cam, means for driving said cam from said main shaft including a clutch mechanism, and means operated by said cam for successively bringing in a predetermined order said thread distributors into their operative positions under said needle, the clutch mechanism being adapted to disconnect the cam from its driving shaft, thus allowing the machine to execute an ordinary chain stitch.

6. An embroidery machine of the type described according to claim 3 in which the means for driving the cam from the main shaft include a change speed mechanism whereby the cam can be caused to rotate at different speeds so as to vary the embroidery effects.

7. An embroidery machine of the type described comprising in combination, a needle, at least two thread distributors adapted to move horizontally with respect to said needle, means for controlling the horizontal displacement of said distributors so as to bring any of them into its operative position under said needle, said means including a pivoting lever extending downwardly from the table of the machine, and a plate at the lower end of said lever adapted to be engaged by the operator's knee for controlling at will the position of the distributors with respect to the needle.

8. An embroidery machine of the type described comprising in combination a needle, a support, a pivot on said support, a plurality of thread distributors, a connecting rod carrying at one end said distributors adapted to both slide and rotate with respect to said pivot, means for rotating said support so as to bring one of said distributors into its operative position with respect to the needle, and means operatively connected to the other end of the connecting rod for causing the distributor that is in the operative position to move with a reciprocating motion along a curved path around the axis of said needle.

9. An embroidery machine of the type described in claim 8 in which the means for driving said support comprise a shaft, a crank at one end of said shaft, a link connecting the end of said crank to said support, a main shaft, a cam, means for driving said cam from said main shaft, an arm keyed on the first named shaft at right angles thereto, and a roller mounted at the end of said arm for cooperating with said cam.

10. An embroidery machine of the type described in claim 8 in which the means operatively connected to the other end of the connecting rod comprise a shaft adapted to receive an axial reciprocating motion, an endless screw on said shaft, a vertically disposed gear in mesh with said screw, and an eccentric operatively connected on the one hand to said gear and on the other hand to said connecting rod.

11. An embroidery machine of the type described in claim 8 in which the means for driving said support comprise a shaft, a crank at one end of said shaft, a link connecting the extremity of said crank to said support, an arm keyed on said shaft at right angles thereto, a spindle journalled on the under face of the table of the machine, a cam keyed on said spindle and operatively engaging the extremity of said arm, a downwardly extending lever keyed on said spindle, and a plate at the lower end of said lever adapted to be engaged by the operator's knee for controlling at will the position of the distributors with respect to said needle.

12. An embroidery machine of the type described comprising in combination a needle, a support at least two thread distributors of the usual type mounted one behind the other on said support, and means for displacing said support under the needle so as to bring the desired distributor into its operative position with respect to the needle in any of a plurality of different orders.

13. An embroidery machine of the type described comprising in combination, a needle, a toothed sector, a sector suitably pivoted to said toothed sector, at least two shuttles mounted on said last mentioned sector, means for actuating the toothed sector, and means for adjusting the relative position of the toothed sector and of the other sector.

14. An embroidery machine of the type described comprising in combination a needle, a cylinder, a plurality of thread distributing tubes fixed on said cylinder, a lever for controlling the position of said cylinder with respect to said needle so as to bring the desired distributing tube into its operative position with respect to the needle, a Cardan joint connecting said cylinder to said lever, an eccentric operatively connected to said cylinder for causing it to rotate about the axis of the needle, and an endless screw operatively connected to said eccentric for rotating it in a reciprocating manner.

15. An embroidery machine of the type described comprising in combination, an adjustable feed mechanism for the fabric, a main driving shaft, a cam, means for driving said cam from said shaft, transmission means including a plurality of jointed levers for causing said cam to control said feed mechanism for automatically varying the length of feed thereof, whereby different materials may be used on the machine.

AROLDO CHITI.